United States Patent
Anderson

[15] 3,666,092
[45] May 30, 1972

[54] SIZER CONVEYOR
[72] Inventor: Earl R. Anderson, Los Gatos, Calif.
[73] Assignee: Brex Corp., Los Gatos, Calif.
[22] Filed: July 6, 1970
[21] Appl. No.: 52,616

Related U.S. Application Data

[62] Division of Ser. No. 684,893, Nov. 6, 1967, abandoned.

[52] U.S. Cl.....................................209/73, 198/219, 209/97
[51] Int. Cl..........................................................B07b 1/16
[58] Field of Search..............................198/219; 209/73, 97

[56] References Cited
UNITED STATES PATENTS

| 2,151,695 | 3/1939 | Goddard | 198/219 |
| 2,497,768 | 2/1950 | Hallead | 198/219 |

Primary Examiner—Richard A. Schacher
Attorney—Allen and Chromy

[57] ABSTRACT

An endless series of grading elements are carried through a grading path and provide transverse grading openings between each adjacent pair. The product to be graded is fed row by row by a transverse feed member which is reciprocated in a timed manner by an essentially harmonic drive means.

3 Claims, 5 Drawing Figures

*INVENTOR.*
EARL R. ANDERSON

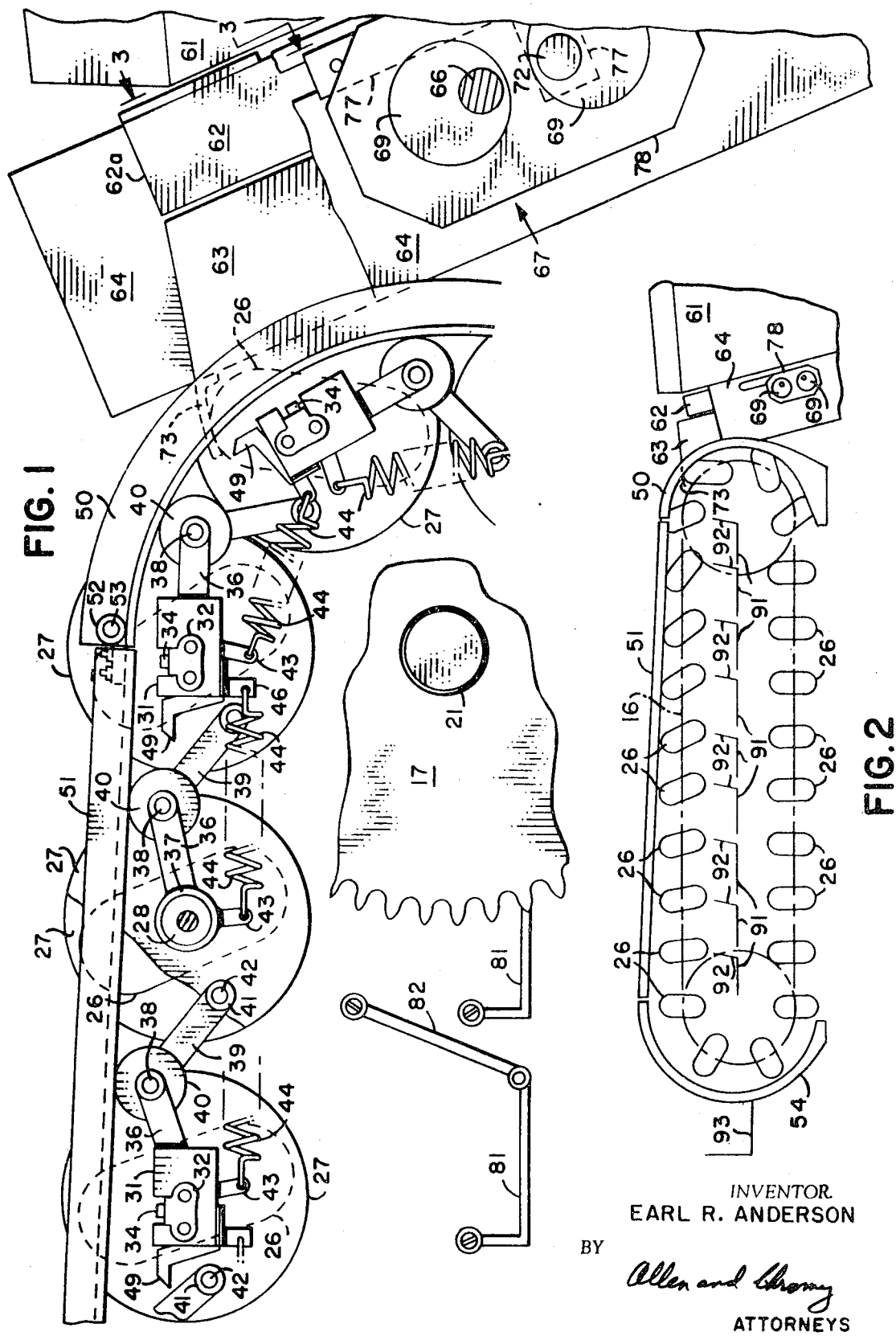

SIZER CONVEYOR

This application is a division of my copending application Ser. No. 684,893 filed Nov. 6, 1967 for Sizer Conveyor, now abandoned.

DESCRIPTION OF INVENTION

This invention relates to the feeding of a grading machine for fruit or vegetable articles in which successive rows of articles are elevated and fed to the successive transverse grading openings by means including a harmonic drive mechanism.

An object of the invention is to provide a grading element in which transverse rows of articles to be graded are carried along a path, and in which means are provided for feeding the grading apparatus row by row with articles to be graded.

Another object of the invention is to provide a shuffle feed mechanism in which a harmonic drive is provided in elevating fruit from a lower position to an upper position with the decreased speed of movement coming as it enters and leaves both of its end positions.

Other objects and advantages of the invention will be apparent from the following description of a preferred embodiment thereof taken in conjunction with the accompanying drawings, in which:

FIG. 1 is a side elevational view of the grading conveyor, certain parts being broken away to show the different components and parts of the cam control means for determining the positioning of the various grading elements;

FIG. 2 is a schematic view illustrating the endless array of grading elements as they travel through their grading path;

Figure 3:
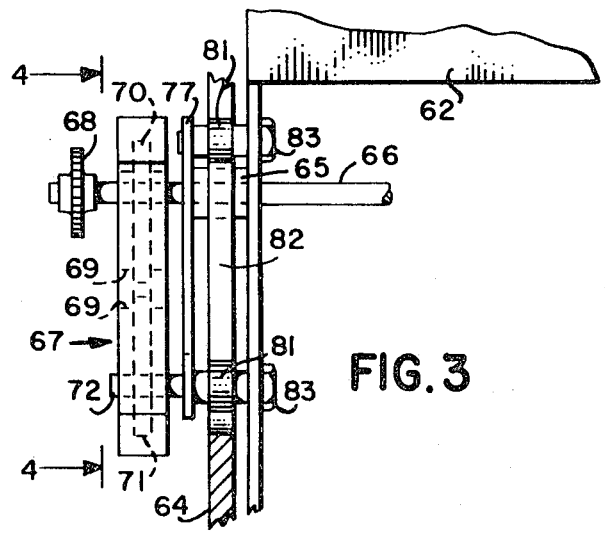
FIG. 3 is a fragmentary transverse sectional view of the shuffle feed mechanism for feeding transverse rows of articles to the grading apparatus, and the plane of the view is indicated by the line 3—3 in FIG. 1.

Referring to FIGS. 1 and 2, the grading machine comprises a pair of conveyor chains 16 which are trained about respective idler sprockets 17 and rotatable driving sprockets mounted on shafts 21 which are supported in said application. An endless series of grading elements 26 (FIGS. 1 and 2 are provided having circular plates 27 secured to the ends thereof, and these plates 27 have respective hubs 28 with suitable bearings therein to receive pivotally respective mounting stub shafts 29 secured in respective carrier blocks 31. Each block 31 is fastened to the adjacent chain 16 by means of an angle extension or bracket 32 forming a part of a chain link in a conventional manner.

Each grading element 26 (FIG. 2) is provided with straight opposite parallel side surfaces 26a, and the opposite side surfaces 26a are joined by arcuate end surfaces 27 which merge smoothly with the respective side surfaces 26a.

A spring-urged linkage is provided for controlling the relatively adjusted pivotal position of each of the grading elements 26 and this linkage is in the form of a toggle linkage comprising a link 36 (FIG. 1) which is provided with a supporting sleeve 37 at one end disposed about and pivoted on the hub 28 of the adjacent grading element 26. Each link 36 comprises a pair of arms and its other end carries a pivot pin 38 in the center axis of this toggle linkage. A roller 40 whose function is described hereinafter is journaled on the pin 38. The second link 39 of the toggle linkage is pivotally connected to the pin 38 and at its opposite end has a hub 41 pivoted about a pin 42 carried by the circular plate 27 of the grading element to be adjusted by the toggle linkage. The plate 27 forms a lever arm extending at right angles to the parallel sides of the grading element 26 and centrally disposed with respect thereto. The sleeve 37 for each toggle arm 36 carries an ear 43 in which one end of a tension spring 44 is connected, the other end of this spring being connected to an ear 46 of a spring plate 47 secured to the block 31 by a suitable cap screw. This plate 47 abuts a second support plate 48 for an offset stop hook 49 which forms a stop for the hub 41 of the lever 39 when the roller 40 is not engaged by a cam as along the lower stretch of the travel of the grading elements as seen in FIGS. 1 and 2, for example.

Each roller 40 (FIGS. 1 and 2) is forced upwardly by the associated spring 44 to engage a common cam track 51 which carries at its one end a pivot bracket 52 engaging a shaft 53 carried by a frame plate 13 of the machine at the entrance end of the grading elements 26 as they start their grading travel. This cam track 51 is a continuation of an arcuate lead-in cam track 50 which is supported in fixed position on the frame, and, as seen in FIG. 1, is engaged by the rollers 40 as the grading elements 26 start their upward travel around the feed end of the apparatus.

It will be seen, therefore, that by elevating the end of the cam track 51 at the discharge end of the machine, the amount of pivoting movement given to each grading element 26 through its toggle linkage 36, 39 will be varied gradually as its idler 40 travels up the cam track 51, and it will also be noted that the adjusted pivoted position of each grading element 26 is held under the influence of its associated spring 44.

Figure 4:
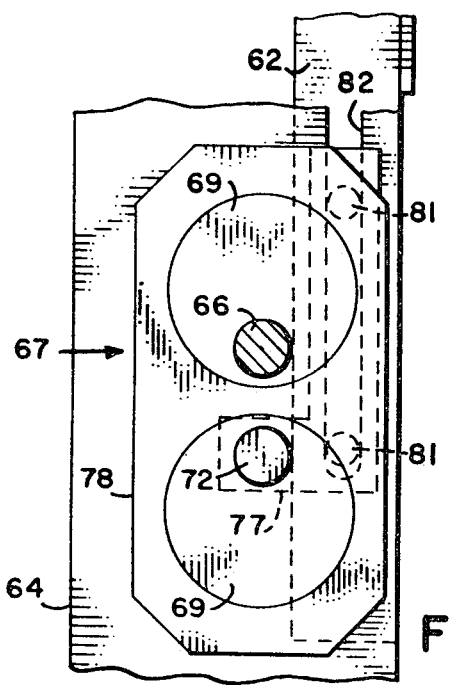
FIG. 4 is a side elevational view of the shuffle feed actuating means partially in section being taken in a plane indicated by the line 4—4 in FIG. 3.
Figure 5:
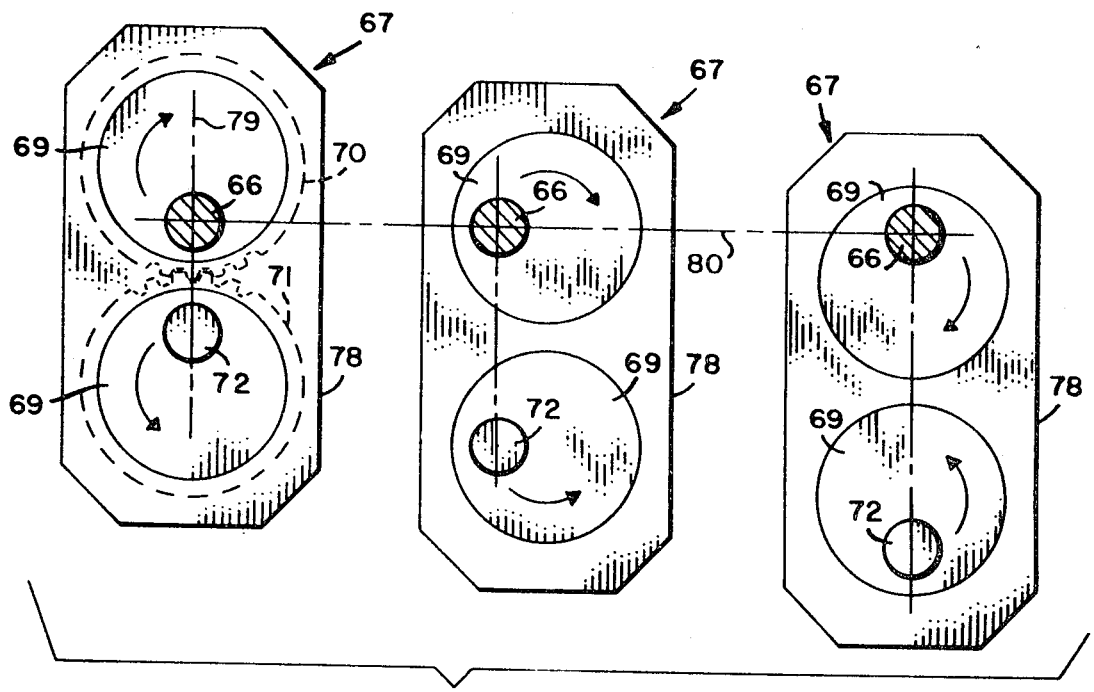
FIG. 5 is a series of schematic views illustrating different portions in different positions of the harmonic drive mechanism during its operation.

Preferably, the articles to be graded are fed row by row to the troughs formed by the adjacent grading elements 26, and this input feed mechanism comprises an inclined feed chute 61 (FIGS. 1 and 2), which, for example, may communicate with the usual type of feed conveyor, such as a merry-go-round, for example. This feed chute 61 leads to a movable shuffle member 62 which serves to lift a row of articles from the position shown at A in FIG. 1 to the downwardly inclined top of a stationary shuffle member 63 from which they roll into a position B in a trough formed between a pair of the ascending grading elements 26. As seen in FIGS. 1 and 2, the gap between the stationary shuffle member 63 and an adjacent grading element 26 is bridged by a flexible flap 73 attached to the member 63 and projecting therefrom into the path of the grading element 26. The stationary shuffle member 63 is suitably secured to and between a pair of opposite frame members 64 (FIGS. 1 and 3) and these frame members 64 provide journalling means 65 for a cross shaft 66 driven from the left side, as seen in FIG. 3, by means of a sprocket 68 from a suitable drive source, not shown. The cross shaft 66 drives a pair of drive units 67 to provide a harmonic reciprocation of the movable shuffle element 62 so that it slows down as it reaches its upper discharge point, speeds up during the intermediate portion of its travel and again slows down as it reaches and leaves its article receiving location. Each harmonic drive unit 67 (FIG. 5) comprises a casing 78 in one face of which a pair of eccentric bearings 69 is journalled for a pair of eccentric gears 70 and 71. The gear 70 has a driving connection with the drive shaft 66 and the gear 71 with a lower aligning shaft 72. The results of the drive from the shaft 66 and the eccentric bearings 69 for the shaft 66 and the shaft 72 is a straight line reciprocating movement of the shaft 72 along a line intersecting its axis and the axis of the shaft 66 with true straight line harmonic motion. This reciprocating movement of the shaft 72 is compound in that the shaft 72 moves bodily with the housing 78, and because of the drive of its eccentric bearing, the shaft 72 also moves with respect to the housing 78. There is also a translatory reciprocating movement of the housing 78 with both vertical and horizontal components of movement. The respective movements of the various parts can be seen in FIG. 5 where the vertical and horizontal center lines 79, 80 of the fixed axis shaft 66 are shown. The shaft 72 externally of the housing 78 is pivotally engaged with the horizontal arm of an angle shaped link 77. The angular shaped link 77 (FIGS. 3 and 4) carries a pair of vertically aligned studs 81 which are guided in vertical slots 82 of the adjacent frame plate 64 and carry supporting links 83 for the movable shuffle member 62. As seen in FIG. 3 the studs 81 are axially aligned with aligning shaft 72 for the associated harmonic drive unit 67.

The effect of the above operation is to give a straight line movement to the slide 62 with its movement accelerating until the middle of its stroke, and then decelerating as it approaches its discharge end or feed end respectively.

To briefly summarize the operation of the machine, and referring to FIGS. 1 and 2, the articles to be graded, such as a field run of peaches for example, are fed down the chute 61 in bulk and in random position. As seen in FIG. 1, a row of these articles will roll onto the movable shuffle feed member 62 when it is in its "down" position as shown in FIG. 1. The angle to the horizontal of the upper surface 62a and the width of this upper surface are so selected that they will elevate from the largest to the smallest of the field run of fruit as a row. Upon elevation of this movable shuffle member 62, as seen for example in FIG. 2, a row of articles is discharged over the inclined top surface of the stationary shuffle member 63, over the flexible transfer flap 73 and into one of the troughs formed by an adjacent pair of the sizing elements 26. The operation of the shuffle feed member 62 is in timed relation to the movement of the grading elements 26 so that as each trough between a pair of these elements 26 presents itself in proper position it receives a row of fruit discharged by movable shuffle member 62. The relative adjustment of grading elements 26 forming the trough is such that they will perform no grading action when a row of fruit is received.

The respective adjacent pairs of grading or sizing elements 26 with a row of articles such as peaches, for example, supported in each trough between each adjacent pair of the sizing elements 26 moves to the left across the top of the stretch and gradually the sizing openings therebetween increase in width to cause the fruit of the correct size range to drop through onto the associated trough 91. The discharge troughs 81 are provided preferably with an adjustable divider 92 which can be set to the appropriate position so that articles of a given size range will fall through into the desired trough 91. The troughs 91 may be either inclined for gravity discharge of the articles or be provided with a belt for a power discharge of the articles. The various sizes are collected as the articles pass across on the sizing elements, and as seen in the drawing, the angularity of these elements are gradually changed until they are substantially parallel at the discharge end, when everything but the largest size will have fallen through into the series of troughs 91 and this larger size will be discharged over the end into the trough 93.

It will be noted that the sizing elements provide only smooth or rounded contours for contact with the articles to eliminate the possibility of bruising, and are held by a spring at the size opening so that there is no tendency to force an article to be wedged therebetween and an effective sizing operation can be performed with the number of sizes required. Because the adjustment of the control cam 51 for the various rollers can be selected to give the number of desired sizes by its rate of rise it is apparent that the sizing equipment is easily adjustable to vary the particular sizing desired with a field run of the articles being sized.

While I have shown and described a certain preferred embodiment of the invention it is apparent that the invention is capable of variation and modification from the form shown so that the scope thereof should be limited only by the proper scope of the claims appended hereto.

I claim:

1. In a grading machine, means providing a plurality of parallel grading openings traveling through an endless path transversely of said path and having at least one stretch during which articles can be fed thereto for grading a bulk feed of articles and a shuffle feed member interposed between said bulk feed and said grading elements for successively depositing a row of articles to be graded between each adjacent pair of grading elements in operative relation to the grading opening therebetween, means for driving said grading elements through said path, means for operating said shuffle feed member including a drive connection at each end thereof, each said drive connection having a drive shaft journalled in fixed position, an eccentric bearing secured to said drive shaft, a movable housing journalled on said bearing, an eccentric gear secured on said shaft, a second eccentric gear in said housing, a second eccentric bearing carried by said second gear and journalled in said housing and a reciprocating shaft carried by said second gear and said second eccentric bearing and having a linear reciprocating motion transverse to its length in response to driving of said drive shaft, said reciprocating shaft having a drive connection to said shuffle feed member.

2. In a machine of the class described comprising a frame, relatively movable shuffle feed members mounted for linear reciprocatory movement on said frame, and drive means for one of said shuffle members including a drive member constrained to linear movement and a drive housing therefor having an orbital translatory movement and having a driving connection to said member, and eccentric gear means carried by said housing for driving said housing in said orbital translatory path.

3. In a machine as claimed in claim 2, said drive means for said shuffle members including a shaft having a fixed bearing support on said frame and a pair of drive connections from the drive means to one of said movable shuffle feed members; each drive connection comprising an eccentric gear in said housing having an eccentric bearing engaged therein, said gear and said bearing being secured to said drive shaft for rotation therewith, whereby said housing has an orbital translatory movement about said drive shaft as a center, a second eccentric gear meshing with said first eccentric gear and having a second eccentric bearing in said housing, a stub shaft rotatably carried by said second eccentric gear and said second eccentric bearing in eccentric relation thereto, the orbital movement of said housing and the rotary movement of said eccentric gears providing a linear harmonic reciprocation of said stub shaft with respect to said drive shaft, and a linkage connection from said stub shaft to said one movable shuffle member to provide said one movable shuffle member with harmonic acceleration and deceleration during each stroke thereof.

* * * * *